Oct. 6, 1925.

J. H. WILSON 1,556,276

WINDMILL

Filed Oct. 1, 1924  2 Sheets-Sheet 1

WITNESS

INVENTOR
J. H. WILSON,
BY
ATTORNEYS

Oct. 6, 1925.
J. H. WILSON
WINDMILL
Filed Oct. 1, 1924    2 Sheets-Sheet 2
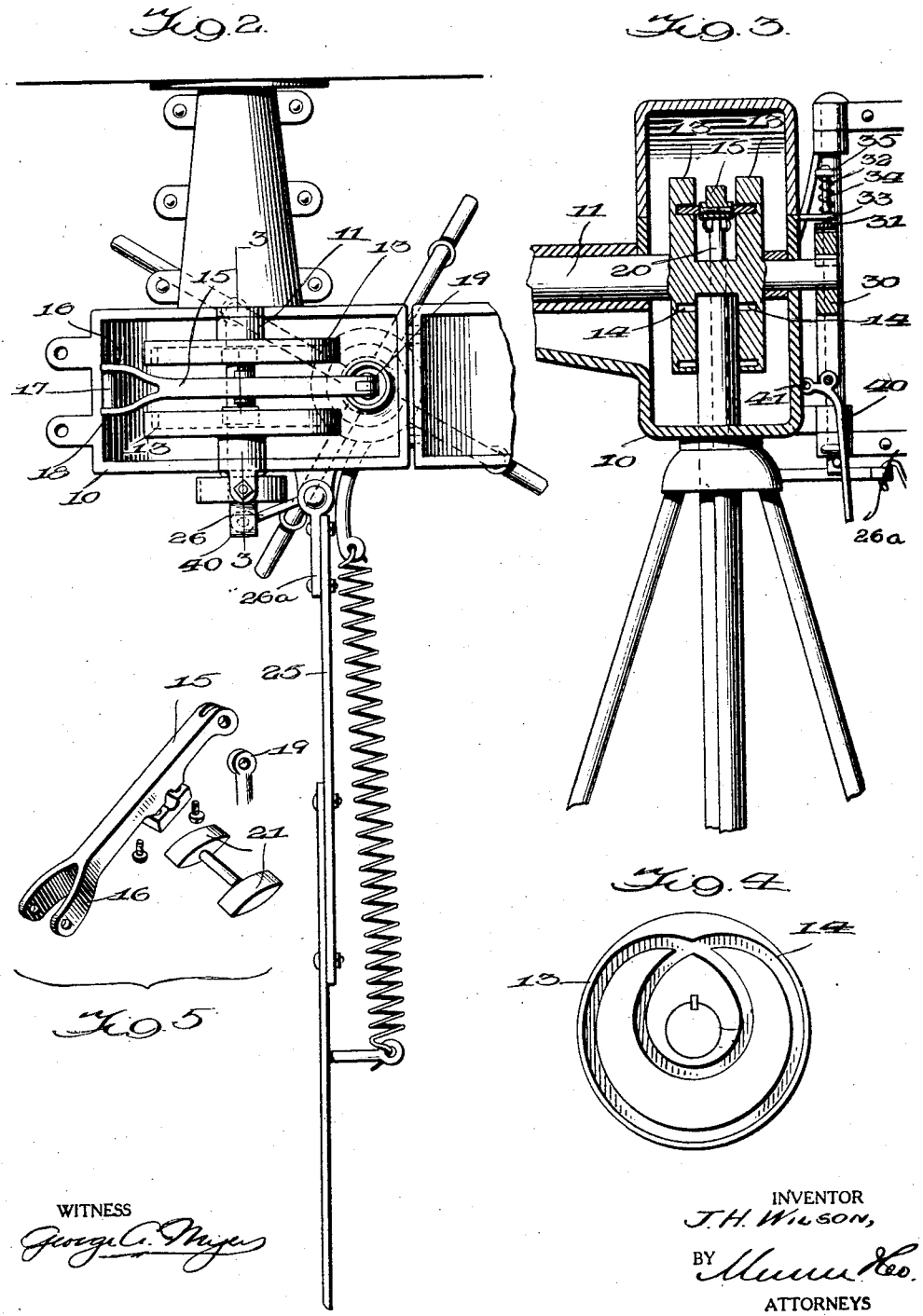
INVENTOR
J. H. Wilson, Patented Oct. 6, 1925.

1,556,276

UNITED STATES PATENT OFFICE.

JOHN H. WILSON, OF MITCHELL, NEBRASKA.

WINDMILL.

Application filed October 1, 1924. Serial No. 740,999.

*To all whom it may concern:*

Be it known that I, JOHN H. WILSON, a citizen of the United States, and a resident of Mitchell, in the county of Scotts Bluff and State of Nebraska, have invented certain new and useful Improvements in Windmills, of which the following is a specification.

This invention relates to wind mills of the type forming the subject-matter of my co-pending application filed March 17, 1924, Serial No. 699,916.

The object of the invention is to provide a wind mill of this character wherein the mechanism for transmitting the motion from the wind wheel to the parts to be actuated is of such a character as to balance the lateral thrusts and strains and transmit a smooth, easy and powerful movement.

A further object is to provide an automatic braking mechanism for retarding and stopping the movements of the operative parts of the wind mill when the wind wheel has been shifted to inoperative position.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 2 is a fragmentary plan view of a wind wheel embodying the present invention, the wheel proper being omitted;

Figure 3 is a view in section on line 3—3 of Figure 2, and showing the top or cover in closed position;

Figure 4 is a detail view in elevation of the grooved face of one of the cams employed; and Figure 5 is a group view in perspective of the cam followers and the lever on which they are mounted.

Figure 1:
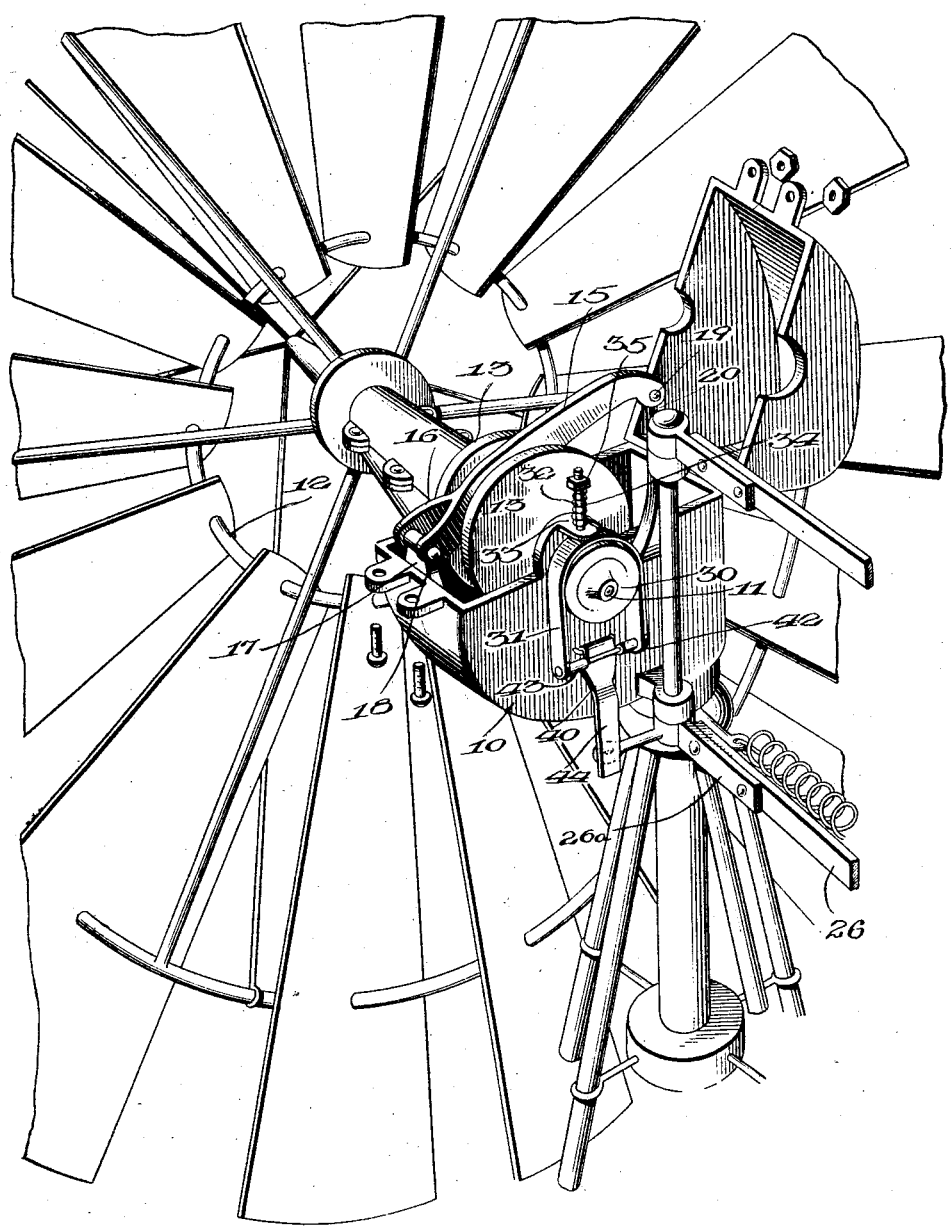
Figure 1 is a fragmentary perspective view, showing a wind wheel embodying the present invention.

Referring to the drawings, the numeral 10 designates a housing in which a horizontal shaft 11 is rotatably mounted, the shaft 11 being journaled in bearings provided therefor on the housing. At one end of the horizontal shaft a wind wheel 12 is fixed. A pair of cams, designated at 13 are fixed to that portion of the shaft 11 which lies within the housing 10 and the confronting faces of these cams are formed with double cam grooves 14, as shown to advantage in Figure 4. As illustrated in the drawing the cams 13 are arranged in spaced relation along the shaft 11 and in the space between the cams a rockable lever 15 operates. One end of the lever 15 is bifurcated as at 16 and is fulcrumed on a bracket 17 provided on the housing 10 by means of a pivot pin 18. The opposite end of the lever 15 from that fulcrumed on the housing is suitably connected, as at 19, to the plunger or pump rod 20. Intermediate its ends the lever 15 has a pair of followers 21 pivotally connected thereto. The followers 21 are arranged on the opposite sides of the lever 15 and operates in the groove 14 of the cams 13. By providing two cams and two followers and locating the lever midway between the cams the tendency to sidewise swing or lateral thrust on part of the lever 15 is balanced or taken up. Moreover, the use of two cams provides a smooth running mechanism whereby a powerful impulse or movement is imparted to the plunger or pump rod.

As in the other application hereinabove referred to a vane 25 is pivotally mounted on the housing 10 to one side of the axis of the shaft 11 and the axis of the vane 25 has fixed thereto a crank arm 26 which connects with the chain employed for the purpose of manually shifting the wheel to inoperative position. It is proposed to use the swing of the vane 25 to actuate or set braking mechanism whereby the motion of the shaft 11 and of the parts connected therewith is retarded and stopped when the wheel moves to inoperative position.

For this purpose braking mechanism is provided and includes a braking drum 30 fixed to the portion of the shaft 11 which projects beyond the rear wall of the housing cap and a brake band 31 extending around the drum 30. The band 31 is preferably of substantially U-shaped form and to the bight or body portion of the brake band 31 a stud 32 is connected. The stud 32 is slidably fitted in an opening provided therefor in the bracket 33 carried on the housing above the drum 30. A coil spring 34 is arranged to encircle the stud 32 and one end of the coil spring abuts the bracket 33 while the other end abuts a nut 35 threaded on the upper end of the stud 32 so that the spring 34 tends to pull the band 31 upwardly and disengage the band 31 from the drum 30. A bell crank lever 40 is fulcrumed at the end of its short arm on the housing, as clearly shown at 41 in Fig. 3. The juncture of the short arm and the long arm is pivotally connected to the ends of the band 31 by means of a pivot pin 42 engaged in pivot openings of the band 31 and passing through pivot ears 43 formed on the bell crank 40. The long arm of the bell crank lever which is designated at 44 lies in the path of swing of a plate or casing 26ª on the vane 26 and is engaged by the casing 26ª so that when the vane is swung to such position as to throw the wind wheel around to inoperative position the casing 26ª will swing the bell crank lever 40 so as to tighten the band 31 around the drum 30 and retard and eventually stop the shaft 11, the cams 13 and the lever 15.

I claim:

1. In a wind mill, a housing, a shaft rotatably mounted on the housing, a wind wheel fixed to one end of the shaft, a pair of cams fixed to that portion of the shaft which lies within the housing, said cams being spaced and having double cam grooves in their confronting faces, a lever fulcrumed on the housing and operating in between the cams, and a pair of followers pivotally mounted on the intermediate portion of the lever and operating in the grooves of the cams.

2. In a wind mill, a housing, a shaft rotatably mounted on the housing, a wind wheel fixed to one end of the shaft, a pair of cams fixed to that portion of the shaft which lies within the housing, and a lever fulcrumed on the housing and operatively connected with the pair of cams.

3. In a wind mill, a housing, a rotatable shaft mounted on the housing, a wind wheel fixed to the shaft, a controlling vane associated with the housing, a braking mechanism including a drum fixed to the shaft, a braking band extending around the drum, spring means for releasing the braking band, and motion transmission means between the vane and the band for tightening the band on the drum when the vane is swung to inoperative position.

4. In a wind mill, a housing, a rotatable shaft mounted on the housing, a wind wheel fixed to the shaft, a controlling vane associated with the housing, a braking mechanism including a drum fixed to the shaft, a braking band extending around the drum, spring means for releasing the braking band and comprising a stud connected to the brake band, a bracket connected to the housing and having an opening in which the stud is slidably fitted, a spring encircling the stud above the bracket, a nut threaded on the stud and engaging the spring for tensioning the same, and motion transmission means between the vane and the band for tightening the band on the drum when the vane is swung to inoperative position.

JOHN H. WILSON.